United States Patent [19]
Von Buren et al.

[11] Patent Number: 5,143,733
[45] Date of Patent: Sep. 1, 1992

[54] INJECTION MOLDING APPARATUS

[75] Inventors: Stefan Von Buren, Toronto; Vitaly Akselrud, Richmond Hill, both of Canada

[73] Assignee: Husky Injection Molding Systems Ltd., Bolton, Canada

[21] Appl. No.: 687,497

[22] Filed: Apr. 19, 1991

[51] Int. Cl.$^5$ .............................................. B29C 45/23
[52] U.S. Cl. ................... 425/130; 264/328.8; 264/328.9; 264/328.13; 264/328.15; 425/549; 425/557; 425/560; 425/562; 425/564; 425/573
[58] Field of Search ............. 425/130, 133.1, 549, 425/557, 559, 560, 562, 564, 573, 566; 264/328.8, 328.9, 328.13, 328.15

[56] References Cited

U.S. PATENT DOCUMENTS

| | | | |
|---|---|---|---|
| 4,497,621 | 2/1985 | Kudert et al. | 425/145 |
| 4,518,344 | 5/1985 | Latreille et al. | 425/570 |
| 4,525,134 | 6/1985 | McHenry et al. | 425/130 |
| 4,526,821 | 7/1985 | McHenry et al. | 428/35 |
| 4,609,516 | 9/1986 | Krishnakumar et al. | 425/130 |
| 4,657,496 | 4/1987 | Ozeki et al. | 425/130 |
| 4,701,292 | 10/1987 | Valyi | 425/130 |
| 4,710,118 | 12/1987 | Krishnakumar et al. | 425/130 |
| 4,717,324 | 1/1988 | Schad et al. | 425/130 |
| 4,775,308 | 10/1988 | Schad et al. | 425/130 |
| 4,778,308 | 10/1988 | Stove | 405/204 |
| 4,808,101 | 2/1989 | Schad et al. | 425/130 |
| 4,863,665 | 9/1989 | Schad et al. | 264/328.8 |
| 4,931,234 | 6/1990 | Schad et al. | 425/588 |
| 5,049,345 | 9/1991 | Collette | 425/130 |

*Primary Examiner*—Tim Heitbrink
*Attorney, Agent, or Firm*—Bachman & LaPointe

[57] ABSTRACT

Apparatus for forming multilayered articles including a nozzle communicating with the mold cavity. The nozzle includes a first nozzle channel for feeding a first thermoplastic material to the mold cavity and a second nozzle channel communicating with the first nozzle channel for feeding a second thermoplastic material to the mold cavity. A metered amount of second material is fed from the second nozzle channel to the first nozzle channel and subsequently to the mold cavity by the first material from the first nozzle channel.

10 Claims, 4 Drawing Sheets

INJECTION MOLDING APPARATUS

BACKGROUND OF THE INVENTION

The present invention relates to the formation of plastic articles having multilayered walls by coinjection of two or more thermoplastic materials wherein the starting materials can if desired have substantially different optimum processing temperatures.

The simultaneous or sequential injection (coinjection) of two or more resins into a mold cavity to develop layered wall structures is well known as evidenced by the disclosures of U.S. Pat. Nos. 4,497,621, 4,518,344, 4,525,134, 4,526,821, 4,609,516 and 4,657,496.

These disclosures, while providing separate flow paths for the respective resins, do not show or suggest a method for maintaining each resin at its optimum processing temperature during transit from an extruder or other source to the mold cavity.

The maintenance of processing temperatures of each individual resin is especially important when the optimum processing temperature of one resin causes degradation of a second resin or vice versa.

For example, it is frequently desirable to mold a layered wall structure for a hollow article or a preform where coinjection materials include ethylene vinyl alcohol copolymer (EVOH) which process most satisfactorily at temperatures ranging from 400° to 440° F. and polyethylene terephthalate (PET) which processes best at temperatures ranging from 500° to 550° F. As stated previously, failure to maintain these optimum temperatures individually leads to degradation of one resin or the other resulting in defective product.

Various art references describe the process of sequential coinjection including U.S. Pat. Nos. 4,710,118, 4,497,621, 4,657,496, 4,808,101 and 4,701,292.

In addition, art references describe insulating various components in a sequential coinjection device so that the resins can be processed at their optimum temperatures, see U.S. Pat. Nos. 4,717,324, 4,775,308, 4,863,665 and 4,931,234.

It is desirable to develop an apparatus to coinject two or more resins into a mold cavity through the same orifice while minimizing thermal degradation, especially to provide separate temperature control of the resins in the hot runner area and to minimize the volume and residence time of one of the resins in the nozzle area so as to minimize its exposure to thermal degradation.

SUMMARY OF THE INVENTION

Accordingly, it is a principal object of the present invention to provide an apparatus for coinjecting multilayered plastic articles through a single orifice while minimizing thermal degradation.

It is a particular object of the present invention to provide a construction which minimizes the volume and residence time of one of the resins in the nozzle area so as to minimize its exposure to thermal degradation.

It is a further object of the present invention to provide an apparatus as aforesaid which operates in a simple and expeditious manner and enables the injection of metered amounts of material.

In accordance with the present invention, the foregoing objects and others may be readily obtained. A coinjection molding apparatus in accordance with the present invention for molding articles and preforms having multilayered walls comprises: at least one mold cavity having a nozzle individual thereto; a hot runner system including a first and second conduit means for supplying a first and second thermoplastic material respectively to said mold cavity, each material originating from a separate source, wherein the conduit means define separate and individual channels for each thermoplastic material; heating means associated with the apparatus for maintaining said materials at their appropriate temperatures in said conduit means; a first nozzle channel communicating with said first conduit means and mold cavity for feeding a first material from said first conduit means to said mold cavity; a second nozzle channel communicating with said second conduit means and first nozzle channel for feeding a second material to said first nozzle channel and thereafter to said mold cavity; and means for feeding a metered amount of second material to said second nozzle channel, whereby a metered amount of second material is fed from the second nozzle channel to the first nozzle channel and subsequently to said mold cavity by first material from the first nozzle channel.

Preferably a valve stem is provided movable in the first nozzle channel to block and open access to the mold cavity. The first nozzle channel has a constricted region adjacent the mold cavity and a relatively wider region upstream of the constricted region, wherein the valve stem is moveable from a forward position seated in the constricted region to block access to the mold cavity from the first nozzle channel to a rearward position in the relatively wider region to open access to the mold cavity from the first nozzle channel. The communication between the first and second nozzle channels is in the constricted region wherein the constricted region is sized to receive a metered amount of second material from the nozzle channel, whereby withdrawal of the valve stem permits entry of the second material into the constricted region.

It is particularly preferred to utilize the features of the present invention for tri-injection, although of course, injection of more than three resins may readily be advantageously employed. Thus, the hot runner may include a separate third conduit means with its own source and heating means for maintaining a third material at its appropriate temperature. A third nozzle channel is provided communicating with the third conduit means for feeding the third material to the mold cavity. The third nozzle channel feeds said mold cavity in a gate area downstream of the communication between the first and second nozzle channels. When the valve stem is in the forward position, access to the mold cavity from the third nozzle channel is blocked. Also, the valve stem includes an intermediate or third position permitting access from the third nozzle channel to the mold cavity but blocking access from the second nozzle channel to the first nozzle channel and of course blocking access of the first and second nozzle channels to the mold cavity.

Further features and advantages of the present invention will appear hereinafter.

DETAILED DESCRIPTION

Figure 1:
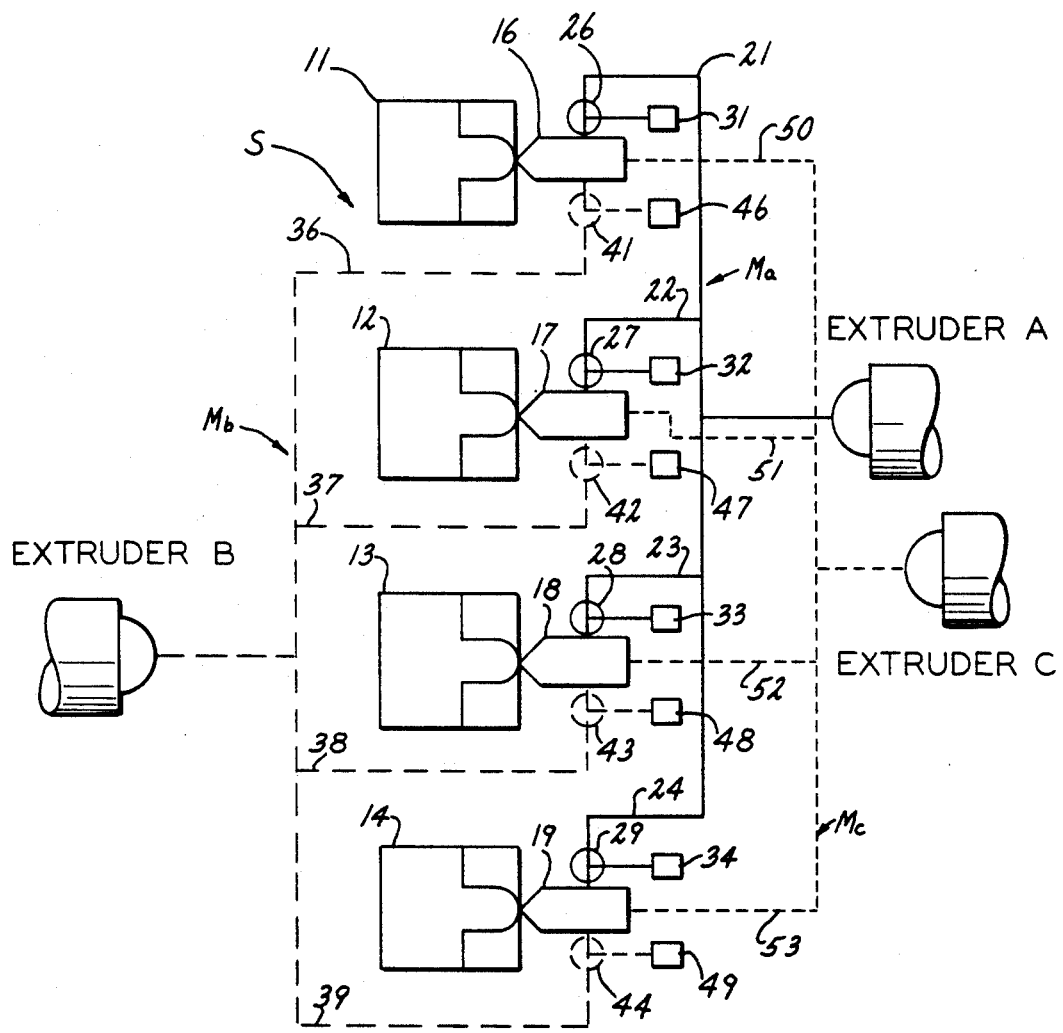
FIG. 1 is a schematic illustration of a hot runner system for a four cavity mold accommodating three thermoplastic resins.

Referring now in detail to the drawings, the illustration of FIG. 1 shows schematically a triple hot runner system S which accommodates three thermoplastic resins suitable for use where each has different optimum processing temperatures. One resin is provided from a source identified as extruder A, a second resin is provided from a source labeled extruder B, and a third resin is provided from a source labeled extruder C.

While the present exemplary embodiment of the invention discloses three resin sources, it is entirely within the spirit and scope of the invention to utilize more than three resin sources.

The portion of the hot runner system leading from extruder A is shown in solid lines, that portion of the system originating with extruder B is shown in dashed lines, and that portion of the system originating with extruder C is shown in dotted lines.

In the embodiment of FIG. 1, the sequence of injection is a first injection from extruder A of virgin PET to form the exterior surface of the article, a second injection from extruder B of the EVOH barrier resin, and a third injection from extruder C of the filler resin which may be reground PET or any other desired filler resins as polyethylene or polypropylene. If desired one could have a fourth injection of virgin PET to finish the gate area. Thus it can be seen that three (3) separate lines are provided, each with their own temperature control to the nozzle.

For purposes of convenient explanation of the invention, the portion of the hot runner system connected to extruder A (solid lines) for virgin PET is maintained by suitable heaters in well-known fashion at a temperature ranging from 500° to 550° F., the optimum processing temperature for a thermoplastic resin such as PET. The portion of the system connected to extruder B (dashed lines) for EVOH is maintained at a temperature ranging from 400° to 450° F., the optimum processing temperature for a thermoplastic resin such as EVOH. If the filler plastic is low density polyethylene, the portion of the system connected to extruder C is maintained at a temperature ranging from 350° to 400° F., whereas, if the filler plastic is reground PET, the portion of the system connected to extruder C is maintained at a temperature ranging from 480° to 500° F. It is to be noted that the resin selected and their optimum processing temperatures are merely exemplary of the present invention and their use in the present description is not intended to limit the invention to those specific resins described above.

Referring further to FIG. 1, the reference numerals 11, 12 and 13 and 14 designate four mold cavities each communicating with individual nozzles 16, 17, 18 and 19.

Extruder A supplies a heated manifold $M_a$ with for example virgin PET, which in turn communicates with each nozzle via hot runners or channels 21, 22, 23 and 24, respectively. The reference numerals 26, 27, 28 and 29 designate spool valves which operate to control charging of shooting pots or injection cylinders 31, 32, 33 and 34.

Correspondingly, hot manifold $M_b$ supplies for example EVOH leading from extruder B to each nozzle 16, 17, 18 and 19 via hot runners or channels 36, 37, 38 and 39. Spool valves 41, 42, 43 and 44 control charging of shooting pots 46, 47, 48 and 49. Hot manifold $M_c$, supplying for example reground PET, polyethylene, or polypropylene, leads from extruder C directly to each nozzle 16, 17, 18, 19 via hot runners 50, 51, 52 and 53. It is noted that extruder C leads directly to the nozzles without the use of shooting pots, although shooting pots could of course be used.

While the schematic of FIG. 1 shows a hot runner system leading from three sources (extruders A, B and C) transporting conditioned thermoplastic resins to a four cavity mold, it is entirely within the scope and capability of the present invention to service as many as 16 to 72 cavities with resins originating from three or more sources.

Figure 2:
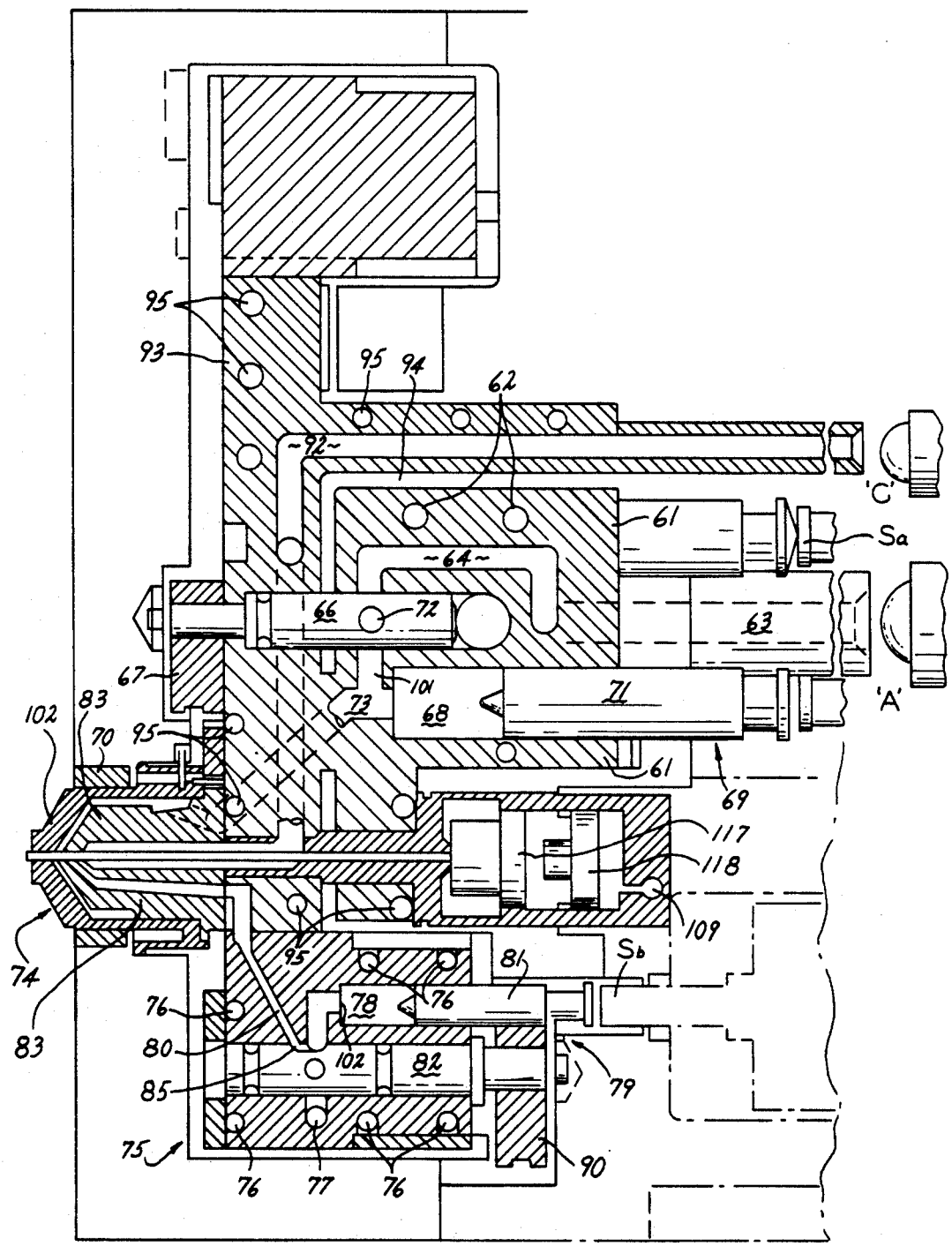
FIG. 2 is a detailed sectional view of a hot runner nozzle assembly.

FIG. 2 is a section of the hot runner system in the immediate vicinity of any one of the four nozzle-cavity assemblies of FIG. 1, i.e. cavity 11 and nozzle 16, for example and is described in connection with an exemplificative embodiment.

A central manifold block 61 maintained at an operating temperature ranging from 500° to 550° F. for virgin PET by heating elements 62—62 receives plasticized resin from extruder A through channels 63 and 64. Spool valve or rotary valve 66, in circuit with channel 64 and operated (rotated) by link mechanism 67, controls the charging of reservoir 68 of the shooting pot or injection cylinder 69 equipped with an injection piston or charging piston 71. The spool valve 66 is formed with a transverse throughbore 72 and is shown in FIG. 2 in the closed position. The reservoir 68 communicates with channel 73 which leads to the nozzle assembly indicated generally by the reference number 74.

Heating elements 62—62 maintain the desired processing temperature of channel 73.

Heat conducted from manifold block 93 to the nozzle assembly 74 maintains the integrity of the desired temperature range within the nozzle.

A manifold segment 75 secured to manifold block 93 is heated by elements 76—76 to maintain optimum temperature of to 440° F. for EVOH in the hot runner connecting extruder B (not shown in FIG. 2) to channel 77 leading to the reservoir 78 of a second shooting pot 79 equipped with an injection or charging piston 81.

Here again, a spool valve 82 (shown in FIG. 2 in the closed position relative to channel 77) controls charging of the reservoir 78. In the closed position of the spool valve 82, the reservoir 78 communicates with the nozzle assembly 74 via channel 80 by virtue of cut-out 85. When the spool valve 82 is open the channel 80 is closed. Link mechanism 90 operates to rotate valve 82.

Figure 3:
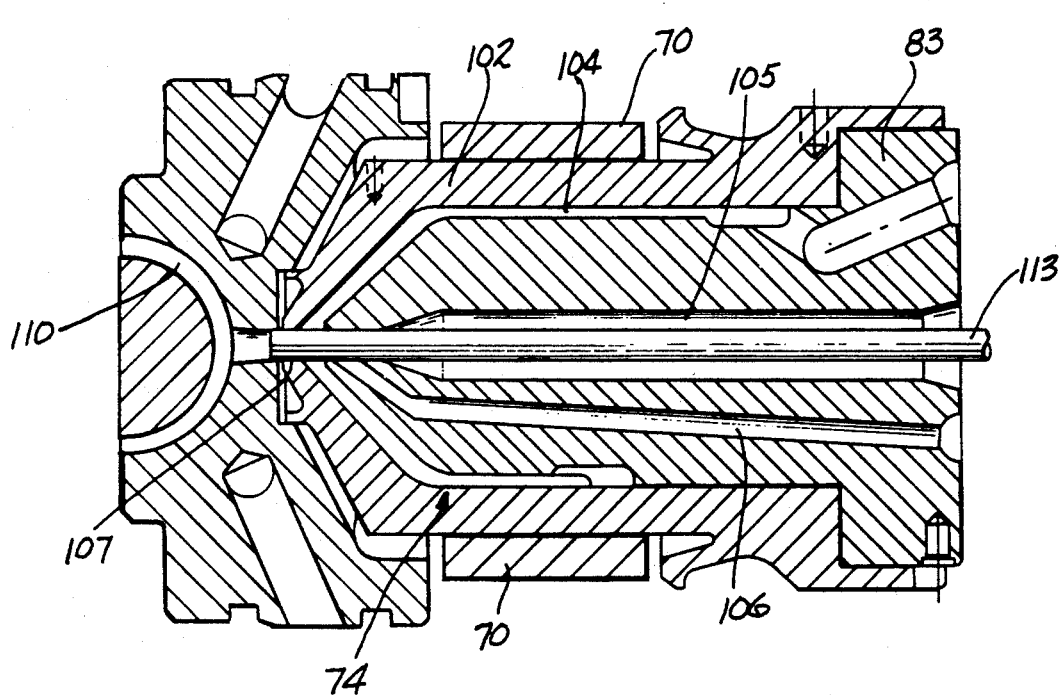
FIGS. 3-5 are detailed sectional views of the nozzle showing the valve stem in different positions for tri-injection.

Referring to FIG. 3, note that nozzle assembly 74 includes a central spigot or inner nozzle 83 in thermal contact with manifold block 93 adjacent local heating elements 95 as can be clearly seen in FIG. 2. The inner nozzle 83 is preferably fabricated of a good metallic thermal conductor, such as beryllium copper.

In the coinjection of multilayer articles including PET and EVOH where the EVOH forms the barrier layers as shown for example in U.S. Pat. No. 4,808,101, the EVOH is typically 1-3% of the total shot weight. On an individual cavity basis, for example, for molding a 0.5 liter preform weighing 32 grams this represents an EVOH shot weight of 0.3-0.9 grams or less than 1 cc of resin. This is a very small volume. It is well known that EVOH is subject to degradation if exposed to elevated temperatures over an extended period of time. Since PET is processed at a higher temperature than EVOH and since both must be in close proximity in a coinjection nozzle, it becomes important to effectively thermally insulate one from the other and to minimize the time EVOH is exposed to the processing temperature of the PET. In accordance with the present invention it has been found that the insulated hot runner systems plus the nozzle design effectively minimizes thermal degradation of resins in a coinjection system wherein the resins have different processing temperatures.

Figure 4:
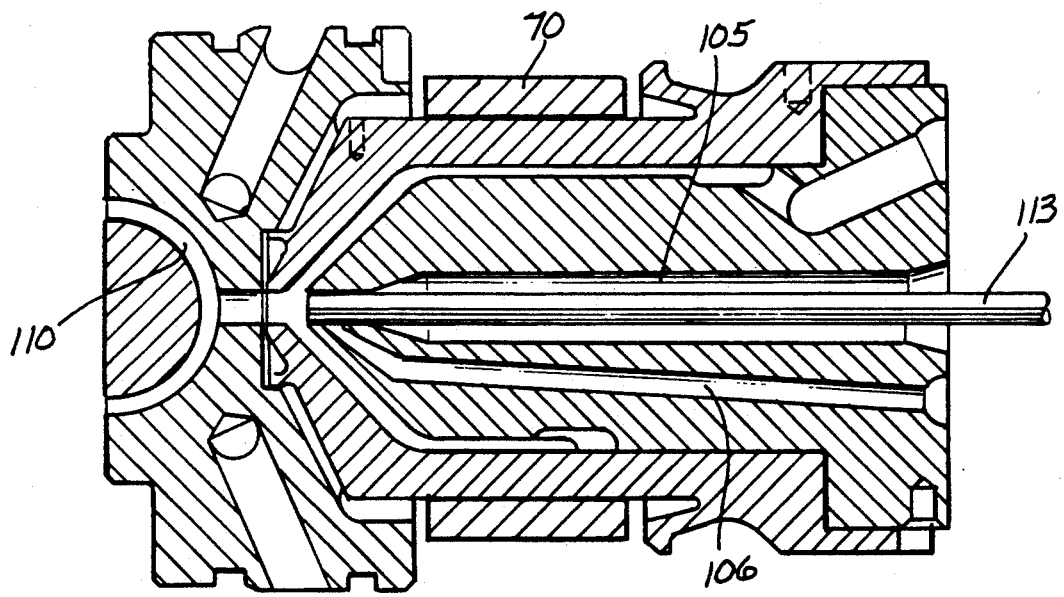
Figure 5:
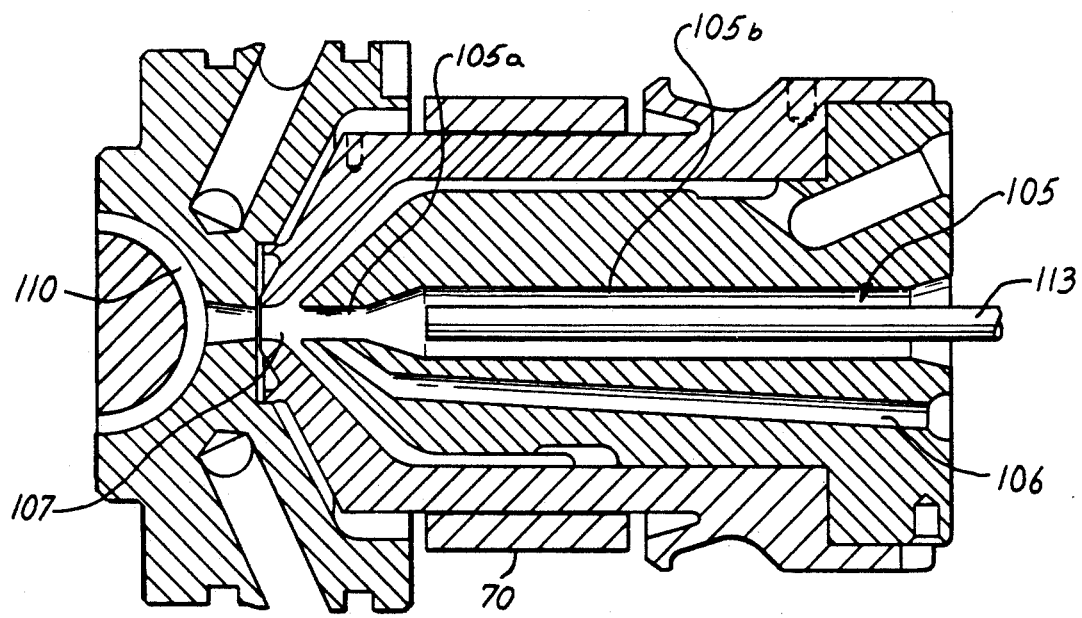

Thus, as shown in FIG. 2 and as discussed above, PET is supplied from source A, barrier resin as EVOH from source B (not shown) via channel 77 and a third resin or a second PET source from source C. Nozzle 74 is shown in FIGS. 3-5 in various stages of operation in an operating cycle. Referring to FIG. 3, nozzle 74 includes inner nozzle 83 and housing 102 heated by band heater 70 with annular passage 104 between the housing 102 and inner nozzle 83 for conveying the first shot of resin (PET) from source A via channels 63 and 64, shooting pot 69 and channel 73 to gate area 107 and mold cavity 110 as described above. Central passage 105 is connected to source C. A small drilled hole 106, connected to source B (EVOH), feeds directly into the downstream portion of channel 105 or gate area 107. Valve stem 113, controlled by two air pistons 117 and 118 (FIG. 2) in a manner that will be described below, is moveable into three positions.

In FIG. 3, valve stem 113 is shown fully forward in gate area 107 and closing the orifice to the mold cavity. It also blocks the outlet of all three nozzle channels 104, 105 and 106. For simplicity, nozzle channels are shown without resin therein.

In FIG. 4, valve stem 113 is retracted to an intermediate or first open position by operating air piston 117 by known means by maintaining air piston 118 fully forward by supplying air pressure through port 109. In this manner, the valve stem has opened only channel 104 permitting injection piston 71 to deliver a metered amount of resin from source A into the mold cavity.

In FIG. 5 valve stem 113 is fully retracted to its rearward or second open position by operating piston 118 and allowing piston 117 to push it back by venting air pressure from channel 109. In this position valve stem 113 has opened both the barrier (EVOH) resin channel 106 and the central channel 105. Channel 105 has a constricted region 105a adjacent the mold cavity 110 and gate area 107 and a relatively wider region 105b upstream of constricted region 105a. When valve stem 113 is in its intermediate position and in its forward position it seats in constricted region 105a to block flow therethrough as shown in FIGS. 3 and 4. The retraction of stem 113 as shown in FIG. 5 immediately creates a local space of negative pressure in constricted space 105a, the space vacated by valve stem 113. This space is immediately filled by barrier resin from channel 106 since its port is opened before the central channel 105 is unblocked and valve 66 has been shifted to block channels 101 and 104 inhibiting any sucking of resin from this source. Further, the injection piston 81 for the barrier resin is timed to advance at the same time that stem 113 begins to retract to its second open or fully retracted position, thus insuring that the metered shot of barrier resin (EVOH) is delivered into space 105a of channel 105 at the same time that the low pressure is created in space 105a. The diameter and length of space 105a is sized to have a volume at least larger than the volume of barrier resin to be injected into mold cavity 110, that is the volume of barrier resin delivered by the stroke of injection piston 81. After valve stem 113 has reached its full or second open position and after space 105a has been filled by barrier resin, the third resin in channel 105 will flow to fill the remaining space in front of the retracted valve stem.

After retraction of valve stem 113 as shown in FIG. 5, the source C is energized to cause the resin in channel 105 and upstream to be injected. In so doing the volume of barrier resin in space 105a is advanced into the mold cavity ahead of the resin from source C. Injection of resin from source C then continues until mold cavity 110 is filled and packed. The resin from source C thus discharges all of the barrier resin from constricted space 105a into mold cavity 110. The resins while flowing simultaneously enter the mold in sequence and thus form multiple layers as shown in U.S. Pat. No. 4,808,101.

The flow pattern is simple and convenient and degradation of the resin in the nozzle is minimized.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A molding apparatus for molding articles and preforms having multilayered walls, which comprises:

at least one mold cavity, said cavity having a nozzle individual thereto with a gate area in the nozzle adjacent the mold cavity;

a hot runner system including a first and second conduit means for supplying a first and second thermoplastic material, respectively, to aid mold cavity, each material originating from a separate source, wherein the conduit means define separate and individual channels for each thermoplastic material;

heating means associated with the apparatus for maintaining said materials at their appropriate temperatures in said conduit means;

a first nozzle channel communicating with said first conduit means, gate area and mold cavity for feeding a first material from said first conduit means to said gate area and thence to said mold cavity;

a second nozzle channel communicating with said second conduit means and first nozzle channel; and means for feeding a small metered amount of second material to said second nozzle channel in an amount less than about 3% of the total weight of the material fed to the mold cavity;

a valve stem movable in said first nozzle channel;

wherein said first nozzle channel has a constricted region adjacent and upstream of said gate area sized to receive said metered amount of second material and a region upstream of the constricted region wider than the constricted region, with the second nozzle channel communicating with the first nozzle channel in said constricted region, including means for moving the valve stem from a forward position seated in the constricted region to block access to the gate area from the first and second nozzle channel, to a position permitting entry of said metered amount of second material into the constricted region while blocking access to the constricted region from the first nozzle channel, to a rearward position in the relatively wider region to open access to the gate area from the first nozzle channel, whereby said metered amount of second material is fed from said second nozzle channel to said constricted region and subsequently to said gate area and mold cavity by first material from said first nozzle channel.

2. An apparatus according to claim 1 wherein said hot runner system includes a third conduit means for supplying a third thermoplastic material to said gate area and mold cavity originating from its own separate source to a third nozzle channel therefor, and also including heating means associated therewith for maintaining said third material at its appropriate temperature in said third conduit means.

3. An apparatus according to claim 2 wherein the third nozzle channel communicates with said gate area downstream of said constricted region.

4. An apparatus according to claim 3 wherein said second nozzle channel is a single channel which communicates with said first nozzle channel from only one side of said constricted region.

5. An apparatus according to claim 3 wherein when said valve stem is in the forward position access to the gate area and mold cavity from the third nozzle channel is blocked, and wherein said valve stem includes an intermediate position permitting access from the third nozzle channel to the gate area and mold cavity but blocking access from the second nozzle channel to the constricted region.

6. An apparatus according to claim 2 wherein said second nozzle channel is a single channel which communicates with said first nozzle channel from only one side of said constricted region and is operative to feed a barrier material which is subject to degradation if exposed to elevated temperatures over an extended period of time.

7. A tri-injection molding apparatus for molding articles and preforms having multilayered walls, which comprises:

at least one mold cavity having a nozzle individual thereto with a gate area in the nozzle adjacent the mold cavity;

a first nozzle channel communicating with said gate area and mold cavity for feeding a first thermoplastic material from said first nozzle channel to said gate area and thence to said mold cavity;

a valve stem movable in the first nozzle channel;

a second nozzle channel communicating with sad first nozzle channel for feeding a second thermoplastic material to said first nozzle channel and thereafter to said mold cavity;

means for feeding a small metered amount of second material in an amount less than about 3% of the total weight of the material fed to the mold cavity to said second nozzle channel whereby said metered amount of second material is fed from the second nozzle channel to the first nozzle channel and subsequently to the gate area and mold cavity by said first material from the first nozzle channel; and wherein said first nozzle channel has a constricted region adjacent and upstream of said gate area sized to receive said metered amount of second material and a region upstream of the constricted region wider than the constricted region, with the second nozzle channel communicating with the first nozzle channel in said constricted region, including means for moving the valve stem from a forward position seated in the constricted region to block access to the gate area from the first and second nozzle channel, to a position permitting entry of said metered amount of second material into the constricted region while blocking access to the constricted region from the first nozzle channel, to a rearward position in the relatively wider region to open access to the gate area from the first nozzle channel;

a third nozzle channel communicating with the gate area downstream of the constricted region for feeding a third thermoplastic material to said gate area and mold cavity.

8. An apparatus according to claim 7 wherein when said valve stem is in said forward position access to the mold cavity from the third nozzle channel is blocked, and wherein said valve stem includes an intermediate position permitting access from the third nozzle channel to the gate area but blocking access from the second nozzle channel to the constricted region and from the first nozzle channel to the constricted region, gate area and mold cavity.

9. An apparatus according to claim 8 wherein said second nozzle channel is a single channel which communicates with said first nozzle channel from only one side of said constricted region and is operative to feed a barrier material which is subject to degradation if exposed to elevated temperatures over an extended period of time.

10. An apparatus according to claim 8 wherein said second nozzle channel is a single channel which communicates with said first nozzle channel from only one side of said constricted region.

* * * * *